United States Patent [19]
Imai et al.

[11] 3,819,549
[45] June 25, 1974

[54] ROOM TEMPERATURE VULCANIZING ORGANOSILICONE COMPOSITIONS

[75] Inventors: Kiyoshi Imai; Hiroshi Inomata, both of Annaka, Japan

[73] Assignee: Shinetsu Chemical Company, Tokyo, Japan

[22] Filed: Feb. 2, 1973

[21] Appl. No.: 329,051

[30] Foreign Application Priority Data
Feb. 4, 1972  Japan.............................. 47-012639

[52] U.S. Cl......... 260/18 S, 260/37 SB, 260/46.5 G
[51] Int. Cl............................................. C08g 51/72
[58] Field of Search ........ 260/46.5 G, 18 SB, 37 SB

[56] References Cited
UNITED STATES PATENTS
3,677,996  7/1972  Kaiser et al.................... 260/46.5 G Primary Examiner—Melvyn L. Marquis
Attorney, Agent, or Firm—McGlew and Tuttle

[57] ABSTRACT

Room temperature vulcanizing compositions are provided which comprise, by weight, 100 parts of hydroxyl-endblocked diorganopolysiloxane, from 0.1 to 20 parts of alkoxysilane or alkoxysiloxane having three or more functional groups, from 0.3 to 10 parts of glycerophosphoric acid or a metallic salt thereof, and from 0.05 to 5 parts of a metallic salt of an organic carboxylic acid. Curing can take place for the entire body of the composition inclusive of parts exposed to air. Even the inside of the body can be cured at the same rate, so as to produce cured rubber having superior hardness, elongation and tensile strength.

12 Claims, No Drawings

ROOM TEMPERATURE VULCANIZING ORGANOSILICONE COMPOSITIONS

BACKGROUND OF THE INVENTION

1. Field of the Invention

This invention relates to improved two-liquid type room temperature vulcanizing organosilicone compositions.

2. Prior Art

Conventional two-liquid type room temperature vulcanizing organosilicone compositions have been prepared by mixing immediately before use, hydroxyl-endblocked organopolysiloxane, alkyl silicate, and a metallic salt of an organic acid, so that the mixture would be condensed by dealcoholization in air to cure. (cf. U.S. Pat. No. 2,843,555). Such compositions have been widely used in varied ways, mainly because the resultant curing reaction proceeds at room temperature and the cured products have excellent heat-resisting, electrical and chemical properties. However, with such compositions the curing starts to take place first at the outer surfaces in contact with air and then gradually proceeds inward; therefore, when these compositions were used for making, for example, molded articles and molds which were thick, a remarkably long period of time, say, from several days to several weeks, was required to effect complete cure throughout the entire body of the material.

OBJECTS OF THE INVENTION

It is an object of the present invention to provide novel two-liquid type room temperature vulcanizing organosilicone compositions, free from the above-described disadvantages. These novel compositions consist essentially of (a) 100 parts by weight of hydroxyl-endblocked diorganopolysiloxane, (b) from 0.1 to 20 parts by weight of alkoxysilane or alkoxysiloxane, having three or more functional groups, (c) from 0.3 to 10 parts by weight of glycerophosphoric acid or a metallic salt thereof, and (d) from 0.05 to 5 parts by weight of a metallic salt of an organic carboxylic acid.

DESCRIPTION OF THE INVENTION

This invention is based on the observation that the addition of a small amount of glycerophosphoric acid or a metallic salt thereof to the known two-liquid type room temperature vulcanizing organosilicone compositions serves to make the inside of a molded product made therefrom cure almost simultaneously with its outer surfaces in contact with air, thereby giving a cured rubber product having a superior quality.

The hydroxyl-endblocked diorganopolysiloxane used as ingredient (a) in the composition of the invention is a known basic polymer for a silicone rubber compound and has a viscosity of from 100 to 1,000,000 centistokes at 25°C. It is represented by the general formula

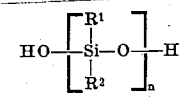

where $R^1$ and $R^2$ are substituted or unsubstituted monovalent hydrocarbon radicals, exemplified by alkyl radicals such as methyl, ethyl, and propyl radicals; aryl radicals such as phenyl, tolyl, xylyl, and naphthyl radicals; and aralkyl groups such as benzyl and phenylethyl radicals, and a variety of halogenized monovalent hydrocarbon radicals. An example most widely used is a polymer whose main chain contains dimethylpolysiloxane.

The alkoxysilane or alkoxysiloxane used as ingredient (b) in the composition of the invention having three or more functional groups is represented by the general formula

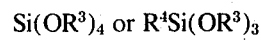

where $R^3$ is a monovalent hydrocarbon radical having from one to four carbon atoms or $-CH_2CH_2OR$ radical where R is a monovalent hydrocarbon radical and $R^4$ is like $R^1$ or $R^2$ as defined above. Also used are hydrolyzed or partially hydrolyzed alkoxysilane or alkoxysiloxane. Illustrative of ingredient (b) are alkyl silicate such as ethyl orthosilicate and propyl orthosilicate, and its partial hydrolysis products such as polyalkyl silicate; and alkoxysilane such as methyltriethoxysilane, phenyltriethoxysilane and vinyltrimethoxysilane, and its partial hydrolysis products.

The glycerophosphoric acid being a novel ingredient (c) in the composition of the present invention can be either $\alpha$ or $\beta$ type. Its metallic salts are exemplified by glycerophosphoric acid salts of a metal selected from the group consisting of alkali metals, e.g., sodium and potassium; alkaline earth metals, e.g., calcium and magnesium; and iron, zinc and manganese. The glycerophosphoric acid or its metallic salt must be used in an amount of from 0.3 to 10 parts by weight against 100 parts by weight of ingredient (a), for if that amount is larger, it would tend to deteriorate the physical properties of the resulting cured rubber. Either metallic salt of glycerophosphoric acid containing water of crystallization or one dried containing no water of crystallization may be used.

Metallic salt of organic carboxylic acid employed as ingredient (d) in the composition is known in the art as a curing catalyst for silicones. Its examples are organic carboxylic acid salts derived from lead, tin, zirconium, antimony, iron, cadmium, titanium, calcium and bismuth, including tin naphthenate, tin octoate, tin butylate, dibutyltin dioctylate, dibutyltin dilaurate, iron stearate, lead octylate, and antimony octylate, but excluding the above-mentioned metallic salts of glycerophosphoric acid.

In addition to the ingredients (a), (b), (c) and (d) above, a variety of inorganic fillers may be used in the compositions of the invention. Such fillers include metallic oxides, such as silica aerogel, diatomaceous earth, quartz powder, iron oxide, zinc oxide, and titanium oxide, and metallic carbonate, such as calcium carbonate and manganese carbonate as well as carbon. The fillers can be used in amounts in a wide range, but preferably not exceeding 300 percent by weight based on 100 percent by weight of the composition comprising ingredients (a), (b), (c) and (d).

The compositions of the invention are prepared by uniformly blending the ingredients (a), (b), (c) and (d), and a filler, but generally by blending ingredients (a), (b) and (c), and the filler in the first place, and just before the application for use adding ingredient (d) to the first mixture, although the blending steps are not limited thereto.

Other ingredients employed in the composition of the invention are known trialkylsilyl-endblocked dialkyl polysiloxane, a heat-resistance improver and a stabilizer, depending upon the objects of applying the composition.

The following examples are illustrative of the invention. All parts and percentages are in weight unless otherwise stated.

EXAMPLE 1

To 100 parts of hydroxyl-endblocked dimethylpolysiloxane, having a viscosity of 5,000 centistokes at 25°C were added 2.5 parts of ethyl polysilicate, 30 parts of dried silica powder, and glycerophosphoric acid or metallic salt thereof in amounts as indicated in Table 1. Each mixture was then uniformly kneaded on three rolls, to produce a test base having a viscosity of about 22,000 cs. at 25°C. Subsequently, 0.5 part of dibutyltin dilaurate was added to the base to make a uniform mixture. It was poured into a glass test tube (diameter: 15 mm and height: 100 mm), and was cured at 25°C for 24 hours. The cured condition at the top and bottom of the test tube as well as the hardness of the cured rubber, as tested in accordance with Japanese Industrial Standard JIS K-6301 are shown in Table 1. In control test No. 1, no glycerophosphoric acid or metallic salt thereof was employed.

It is observed from the above table that when no glycerophosphoric acid or metallic salt thereof was employed, the composition cured into rubbery condition only to the depth of about 10 mm from the top surface of the test tube, with the rest remaining fluid, but when the additive was employed, the whole composition easily cured to the bottom of the test tube. Especially, when 1.0 part of the additive was employed, the composition at the top and that at the bottom of the test tube cured approximately at the same velocity.

EXAMPLE 2

To 100 parts of a linear copolymer composed of hydroxyl-endbonded dimethyl siloxane and diphenyl siloxane, 5 mole % of whose total alkyl groups are phenyl groups with the rest being methyl groups, and which has a viscosity of 7,600 cs. at 25°C were added 7 parts of phenyltriethoxysilane, 35 parts of dried diatomaneous earth, and calcium glycerophosphate in varied amounts as indicated in Table 2. The mixtures were treated and subjected to tests as described in Example 1. The results are shown in Table 2.

Table 2.

|  | Present invention | | | | Control | |
|---|---|---|---|---|---|---|
| Test No. | 7 | 8 | 9 | 10 | 2 | 3 |
| Amount of Calcium glycerophosphate (parts) | 0.5 | 1.0 | 5.0 | 10.0 | 0 | 0.3 |
| Cured condition at the top of the test tube | Good | Good | Good | Good | Good | Good |

TABLE 1

|  | Present invention | | | | | | Control |
|---|---|---|---|---|---|---|---|
| Test No. | 1 | 2 | 3 | 4 | 5 | 6 | 1 |
| Additive | Glycerophosphoric acid | Calcium glycerophosphate | Sodium glycerophosphate | Zinc glycerophosphate | Ferric glycerophosphate | Manganese glycerophosphate | None |
| Parts | 0.5 | 1.0 | 1.0 | 2.0 | 2.0 | 2.0 | 0 |
| Cured condition at the top of test tube | Good | Good | Good | Good | Good | Good | Good |
| Hardness at the top of test tube | 48 | 48 | 47 | 48 | 48 | 48 | 45 |
| Cured condition at the bottom of test tube | Good | Good | Good | Good | Good | Good | Fluid |
| Hardness at the bottom of test tube | 46 | 45 | 45 | 46 | 46 | 45 | 0 |

Table 2.—Continued

|  | Present invention | | | | Control | |
|---|---|---|---|---|---|---|
| Test No. | 7 | 8 | 9 | 10 | 2 | 3 |
| Hardness at the top of the test tube | 51 | 51 | 53 | 55 | 51 | 50 |
| Cured condition at the bottom of test tube | Pretty good | Good | Good | Good | Fluid | Merely gelled |
| Hardness at the bottom of test tube | 10 | 48 | 50 | 54 | 0 | 0 |

EXAMPLE 3

To 100 parts of a linear copolymer containing hydroxyl-endblocked dimethyl siloxane and diphenyl siloxane, 5 mole % of whose total alkyl groups are phenyl groups with the rest being methyl groups, and which has a viscosity of 7,600 cs. at 25°C were added 7 parts of phenyltriethoxysilane, 35 parts of dried diatomaceous earth, and calcium glycerophosphate in such amounts as indicated in Table 3. Each mixture was uniformly kneaded on a three roll roller, to obtain a test base. To this test base was added 0.5 part by weight of dibutyl tin dilaurate and mixed together, and the mixture was placed on a glass plate to produce a block of 50 mm thick. The block thus produced was then allowed to cure at room temperature for 24 hours. Thereafter, the portion of the cured block along the surface of the glass plate with a thickness of 2 mm was cut off. The 2 mm thick sheet thus cut off was subjected to measurements with respect to tensile strength and elongation according to Japanese Industrial Standard JIS K-6301. The results are shown in the following Table 3. Control test No. 5 in the table was conducted without addition of the calcium glycerophosphate.

Table 3.

|  | Present invention | | Control | |
|---|---|---|---|---|
| Test No. | 11 | 12 | 4 | 5 |
| Amount of calcium glycerophosphate used (parts) | 1.0 | 10.0 | 20.0 | 0 |
| Tensile strength (kg/cm$^2$) | 36 | 34 | 35 | 35 |
| Elongation (%) | 190 | 160 | 120 | 180 |

As is evident from the above table, the silicone rubber sheet prepared from the composition comprising 20 parts of calcium glycerophosphate exhibits far lower percent elongation (120 percent), compared to those prepared from the composition of the present invention (190 or 160 percent). It is also noted that the silicone rubber sheets made from the composition of the present invention exhibit almost the same elongation as that which contains no calcium glycerophosphate.

EXAMPLE 4

To 100 parts of terminal hydroxyl-endblocked dimethylpolysiloxane, having a viscosity of 5,200 cs. at 25°C, were added 2.5 parts of ethyl polysilicate and 35 parts of dried silica powder. The mixture was uniformly kneaded on a three roll roller, thereby to produce a test base. Subsequently, to the test base were added 0.5 part of dibutyl tin dilaurate and 1.0 part of calcium glycerophosphate, either undried or dried at a prescribed temperature for a prescribed period of time indicated in Table 3. These mixtures were then treated and subjected to tests as described in Example 1. The results are given in Table 3.

Table 3.

| Drying time and temperature | Undried | 1 hr. 150°C | 28 hrs. 150°C |
|---|---|---|---|
| Cured condition at the top of test tube | Good | Good | Good |
| Hardness at the top of test tube | 56 | 53 | 48 |
| Cured condition at the bottom of test tube | Good | Good | Good |
| Hardness at the bottom of test tube | 56 | 48 | 45 |

What is claimed is:

1. A room temperature vulcanizing organosilicone composition comprising essentially a mixture of ingredients a. 100 parts by weight of hydroxy-endblocked diorganopolysiloxane,
   b. from 0.1 to 20 parts by weight of alkoxysilane or alkoxysiloxane, having three or more functional radicals,
   c. from 0.3 to 10 parts by weight of a glycerophosphoric acid or a metal salt thereof, said metal being selected from the group consisting of alkali metals, alkaline earth metals, iron, zinc and manganese and
   d. from 0.05 to 5 parts by weight of a metal salt of an organic carboxylic acid, said metal being selected from the group consisting of lead, tin, zirconium, antimony, iron, cadmium, titanium, calcium, and bismuth, and the total number of carbon atoms in the organic carboxylic acid moiety thereof not exceeding 24.

2. The composition as claimed in claim 1 which is characterized in that said composition contains an inorganic filler in an amount not exceeding 300 percent by weight based on the total weight of said mixture of ingredients.

3. The composition as claimed in claim 1 in which said hydroxyl-endblocked diorganopolysiloxane has the general formula

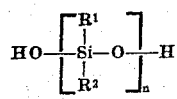

where $R^1$ and $R^2$ are substituted or unsubstituted monovalent hydrocarbon radicals and n is a positive integer, and has a viscosity of from 100 to 100,000 cs. at 25°C.

4. The composition as claimed in claim 1 in which said alkoxysilane or alkoxysiloxane is a compound having the general formula $Si(OR^3)_4$ or $R^4Si(OR^3)_3$ where $R^3$ is a monovalent hydrocarbon radical having from 1 to 4 carbon atoms or —$CH_2CH_2OR$ radical where R is a monovalent hydrocarbon radical and $R^4$ is a substituted or unsubstituted monovalent hydrocarbon radical or hydrolyzed or partially hydrolyzed alkoxysilane or alkoxysiloxane.

5. The composition as claimed in claim 1 in which said metalic salt of an organic carboxylic acid is at least one selected from the group consisting of tin naphthenate, tin octoate, tin butylate, dibutyltin dioctylate, dibutyltin dilaurate, iron stearate, lead octylate, and antimony octylate.

6. A room temperature vulcanizing organosilicone composition comprising a mixture of ingredients
   a. 100 parts by weight of hydroxyl-endblocked diorganopolysiloxane having the general formula

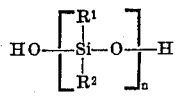

where $R^1$ and $R^2$ are substituted or unsubstituted monovalent hydrocarbon radicals and n is a positive integer, and a viscosity of from 100 to 100,000 cs. at 25°C.,
   b. from 0.1 to 20 parts by weight of alkoxysilane or alkoxysiloxane having the general formula $Si(OR^3)_4$ or $R^4Si(OR^3)_3$ where $R^3$ is a monovalent hydrocarbon radical having from one to four carbon atoms or —$CH_2CH_2OR$ radical where R is a monovalent hydrocarbon radical and $R^4$ is a substituted or unsubstituted monovalent hydrocarbon radical, or hydrolyzed or partially hydrolyzed alkoxysilane or alkoxysiloxane,
   c. from 0.5 to 10 parts by weight of glycerophosphoric acid or a metallic salt thereof, said metal being selected from the group consisting of alkali metals, alkaline earth metals, iron, zinc and manganese and
   d. from 0.05 to 5 parts by weight of at least one metallic salt of an organic carboxylic acid selected from the group consisting of tin naphthenate, tin octoate, tin butylate, dibutyltin dioctylate, dibutyltin dilaurate, iron stearate, lead octylate, and antimony octylate.

7. A composition as claimed in claim 6 which is characterized in that said composition contains an inorganic filler in an amount not exceeding 300 percent by weight based on the total weight of said mixture of ingredients.

8. The composition as claimed in claim 6 which is characterized in that said ingredient (c) is calcium glycerophosphate.

9. The composition as claimed in claim 6 which is characterized in that said ingredient (c) is sodium glycerophosphate.

10. The composition as claimed in claim 6 which is characterized in that said ingredient (c) is zinc glycerophosphate.

11. The composition as claimed in claim 6 which is characterized in that said ingredient (c) is iron glycerophosphate.

12. The composition as claimed in claim 8 which is characterized in that said composition contains an inorganic filler in an amount not exceeding 300 percent by weight based on the total weight of the mixture of the ingredients.

* * * * *